US008655803B2

(12) United States Patent
Lecerf et al.

(10) Patent No.: US 8,655,803 B2
(45) Date of Patent: Feb. 18, 2014

(54) METHOD OF FEATURE EXTRACTION FROM NOISY DOCUMENTS

(75) Inventors: Loic Lecerf, Biviers (FR); Boris Chidlovskii, Meylan (FR)

(73) Assignee: Xerox Corporation, Norwalk, CT (US)

( * ) Notice: Subject to any disclaimer, the term of this patent is extended or adjusted under 35 U.S.C. 154(b) by 974 days.

(21) Appl. No.: 12/336,872

(22) Filed: Dec. 17, 2008

(65) Prior Publication Data

US 2010/0150448 A1    Jun. 17, 2010

(51) Int. Cl.
*G06F 15/18* (2006.01)
(52) U.S. Cl.
USPC .......................................................... 706/12
(58) Field of Classification Search
USPC .......................................................... 706/12
See application file for complete search history.

(56) References Cited

U.S. PATENT DOCUMENTS

| 2003/0078899 | A1 | 4/2003 | Shanahan |
| 2006/0056671 | A1 | 3/2006 | Ghosh et al. |
| 2007/0133874 | A1 | 6/2007 | Bressan et al. |
| 2008/0147574 | A1 | 6/2008 | Chidlovskii |
| 2008/0267505 | A1 | 10/2008 | Dabet et al. |

OTHER PUBLICATIONS

H. Saiga et al., "An OCR System for Business Cards", Document Analysis and Recognition, 1993, Proceedings of the Second International Conference on, pp. 802-805.*
I. Guyon and A. Elisseeff, "An Introduction to Variable and Feature Selection", J. Mach. Learning Research 3 (2003), pp. 1157-1182.*
M. Zimmermann and H. Bunke, "Automatic Segmentation of the IAM Off-line Database for Handwritten English Text", Pattern Recognition, Proc. 16th Int'l. Conf. on, IEEE, 2002, pp. 35-39.*
S. Matsumoto et al., "Sentiment Classification Using Word Subsequences and Dependency Sub-trees", PAKDD 2005, pp. 301-311.*
T. Kameshiro et al., "A Document Image Retrieval Method Tolerating Recognition and Segmentation Errors of OCR Using Shape-Feature and Multiple Candidates", Document Analysis and Recognition, Proc. of the Fifth International Conference on, IEEE 1999, pp. 1-4.*
Yang, et al. "Selecting Structural Patterns for Classification," Proceedings of the 38th Hawaii International Conference on System Sciences, 2005.
Chidlovskii, et al. "Scalable Feature Selection for Multi-class Problems," ECML PKDD 2008, LNAI 5211, pp. 227-240.
Li, et al. "Efficient Feature Selection for High-Dimensional Data using Two-Level Filter," Proceedings of the Third International Conference on Machine Learning and Cybernetics, Shanghai, Aug. 26-29, 2004.

(Continued)

*Primary Examiner* — Kakali Chaki
*Assistant Examiner* — Vincent Gonzales
(74) *Attorney, Agent, or Firm* — Fay Sharpe LLP

(57) ABSTRACT

Aspect of the exemplary embodiment relate to a method and apparatus for automatically identifying features that are suitable for use by a classifier in assigning class labels to text sequences extracted from noisy documents. The exemplary method includes receiving a dataset of text sequences, automatically identifying a set of patterns in the text sequences, and filtering the patterns to generate a set of features. The filtering includes at least one of filtering out redundant patterns and filtering out irrelevant patterns. The method further includes outputting at least some of the features in the set of features, optionally after fusing features which are determined not to affect the classifiers accuracy if they are merged.

25 Claims, 8 Drawing Sheets

(56) References Cited

OTHER PUBLICATIONS

Goethals, *Survey on Frequent Pattern Mining*, HIIT Basic Research Unit, Department of Computer Science, University of Helsinki, 2003.

Hall, *Correlation-Based Feature Selection for Discrete and Numeric Class Machine Learning*, ICML'00: Proc. of the 17$^{th}$ Intl. Conf. on Machine Learning, 1994.

Han, et al., *Frequent Pattern Mining: Current Status and Future Directions*, DataMin. Knowl. Discov., 15(1):55-86, 2007.

Handley, et al., *Document Understanding System Using Stochastic Context-Free Grammars*, In Proc. 8th Intl. Conf. Document Analysis and Recognition (ICDAR), vol. 1, pp. 110-121 (2005).

Kim, et al., *Recognition of English Business Cards Using Enhanced Hybrid Network*, In Advances in Neural Networks, ISNN, Lecture Notes in Computer Science, vol. 3497, pp. 209, 2005 (Abstract).

Kohavi, et al., *Wrappers for Feature Subset Selection*, Artificial Intelligence (1-2):273-323, 1997.

Koller, et al., *Toward Optimal Feature Selection*, In ICML '96: Proc. 13th Intl. Conf. on Machine Learning, pp. 284-292, San Francisco, CA, USA, Morgan Kaufmann Publishers Inc., 1996.

Liu, et al., *Toward Integrating Feature Selection Algorithms for Classification and Clustering*, IEEE Transactions on Knowledge and Data Engineering, 17(4):491-502 (2005).

Singhi, et al., *Feature Subset Selection Bias for Classification Learning*, Proc. of the 23$^{rd}$ Intl. Conf. on Machine Learning, Pittsburgh, PA (2006).

Yu, et al., *Efficient Feature Selection Via Analysis of Relevance and Redundancy*, J. Mach. Learn. Res., 5:1205-1224, 2004.

Kim, et al., *Recognition of English Business Cards Using Enhanced Hybrid Network*, In Advances in Neural Networks, ISNN, Lecture Notes in Computer Science, 2005, vol. 3497, pp. 209-215.

\* cited by examiner

METHOD OF FEATURE EXTRACTION FROM NOISY DOCUMENTS

CROSS REFERENCE TO RELATED PATENTS AND APPLICATIONS

The following application, the disclosure of which is incorporated herein in its entirety by reference, is mentioned:

U.S. application Ser. No. 12/107,875, filed Apr. 23, 2008, entitled SCALABLE FEATURE SELECTION FOR MULTICLASS PROBLEMS, by Boris Chidlovskii and Loïc Lecerf.

BACKGROUND

The exemplary embodiment relates to feature extraction. It finds particular application in the extraction of features from documents, such as scanned documents, where extracted text sequences may include noise, in the form of unpredictable variations from the text of the original document. The extracted features find use in classification and other document processing applications.

Optical character recognition (OCR) techniques employ software which extracts textual information from scanned images. Such techniques have been applied to extract textual information from books, business cards, and the like. Once text is extracted, each text line can be tagged as to data type. In the case of business cards, for example, the data types may include "personal name," "job title," "entity affiliation," "telephone number," "e-mail address," "company URL," and the like. OCR techniques invariably result in some errors, both in the recognition of the individual characters in the digital document and in the correct association of the extracted information with specific data types (tagging).

In a supervised learning approach, a training set of objects, such as text sequences extracted from OCR-ed text documents, is provided with pre-determined class labels. Features of the objects are identified, and a classifier is trained to identify class members based on characteristic features identified from the training set. In some approaches, the class labels may not be provided a priori but rather extracted by grouping together objects of the training set with similar sets of features. This is sometimes referred to as unsupervised learning or clustering.

In the analysis of complex input data, one major problem is the number of features used. The computational complexity of categorization increases rapidly with increasing numbers of objects in the training set, with increasing number of features, and with increasing number of classes. Data analysis with too many features generally requires a large amount of memory and the computation power. Additionally, the classification algorithm may overfit on the training samples and generalize poorly to new samples.

When the input data is too complex to be processed, it can be transformed into a reduced representative set of features; such a transformation is called features extraction. One way to reduce this complexity is to reduce the number of features under consideration. By reducing the number of features, advantages such as faster learning and prediction, easier interpretation, and generalization are typically obtained. If the features are carefully chosen, they are expected to extract the relevant information from the input data in order to perform the desired task, such as populating a form, directing mail, categorizing documents, or the like. However, the removal of features can adversely impact the classification accuracy.

One goal in feature extraction is thus to construct combinations of features that reduce these problems while still describing the complex data with sufficient accuracy. Both rule-based and learning-based systems commonly use rules and regular expressions to analyze the text. As manually-crafted rules for analyzing text tend to be very sensitive to OCR errors, string distance and equivalent dictionary-based techniques and fuzzy rules have been proposed.

Feature extraction from noisy documents is even more challenging when the content noise (OCR errors) is accompanied with the structural noise (segmentation errors). In scanned and OCR-ed documents, document sequences are often under- or over-segmented. In semi-structured documents, the segmentation inconsistency can result from an ambiguous page layout, format conversion, and other issues.

The exemplary embodiment provides an automated method of feature extraction suited to layout-oriented and semi-structured documents, which finds application, for example, in the context of metadata extraction and element recognition tasks.

INCORPORATION BY REFERENCE

The following references, the disclosures of which are incorporated herein in their entireties by reference, are mentioned:

U.S. Pub. No 2006/0056671, published Mar. 16, 2006, entitled AUTOMATED FEATURE EXTRACTION PROCESSES AND SYSTEMS, by Jayati Ghosh, et al., discloses a system and method for automatically feature extracting array images in batch mode. At least two images to be feature extracted are loaded into a batch project. Their features are extracted automatically and sequentially based upon different grid templates or protocols.

U.S. Pub. No. 2007/0133874, published Jun. 14, 2007, entitled PERSONAL INFORMATION RETRIEVAL USING KNOWLEDGE BASES FOR OPTICAL CHARACTER RECOGNITION CORRECTION, by Marco Bressan, et al., discloses a system for updating a contacts database which includes a portable imager for acquiring a digital business card image and an optical character recognizer (OCR) configured to generate textual content candidates for extracted text image segments.

U.S. Pub. No. 2008/0267505, published Oct. 30, 2008, entitled DECISION CRITERIA FOR AUTOMATED FORM POPULATION, by Sebastien Dabet, et al. discloses a method for selecting fields of an electronic form for automatic population with candidate text segments. The candidate text segments can be obtained by capturing an image of a document and applying optical character recognition.

U.S. Pub. No. 2008/0147574, published Jun. 19, 2008, entitled ACTIVE LEARNING METHODS FOR EVOLVING A CLASSIFIER, by Boris Chidovskii, discloses a method and system for classifying a data item, such as a document, based upon identification of element instances within the data item. A training set of classes is provided where each class is associated with one or more features indicative of accurate identification of an element instance within the data item. Upon the identification of the data item with the training set, a confidence factor is computed that the selected element instance is accurately identified. When a selected element instance has a low confidence factor, the associated features for the predicted class are changed by an annotator/expert so that the changed class definition of the new associated feature provides a higher confidence factor of accurate identification of element instances within the data item.

U.S. Pub. No. 2003/0078899, published Apr. 24, 2003, entitled FUZZY TEXT CATEGORIZER, by James Shanahan, discloses a text categorizer for classifying a text object into one or more classes. The text categorizer includes a pre-processing module, a knowledge base, and an approximate reasoning module. The pre-processing module performs feature extraction, feature reduction, and fuzzy set generation to represent an unlabelled text object in terms of one or more fuzzy sets. The approximate reasoning module uses a measured degree of match between the one or more fuzzy set and categories represented by fuzzy rules in the knowledge base to assign labels of those categories that satisfy a selected decision making rule.

BRIEF DESCRIPTION

In accordance with one aspect of the exemplary embodiment, a computer-implemented method includes receiving a dataset of text sequences extracted from document images, automatically identifying a set of patterns in the text sequences, and generating a set of features, which includes filtering the patterns to. The filtering includes at least one of filtering out redundant patterns and filtering out irrelevant patterns. The method further includes outputting at least some of the features in the set of features.

In another aspect, an apparatus for generating and outputting a set of features includes a frequent pattern extractor configured for extracting frequent patterns from an input dataset of extracted text sequences, a feature selection module configured for identifying features from among the frequent patterns by filtering out at least one of patterns which are not relevant and patterns which are redundant. Optionally, a feature fusion module is configured for identifying features which are able to be merged.

In another aspect, a method for training a classifier includes automatically extracting frequent patterns from an input dataset of text sequences without regard to class labels of the text sequences. The method further includes identifying features from among the frequent patterns by filtering out non-relevant and redundant patterns, which may consider class labels associated with the text sequences, and optionally applying at least one criterion for determining whether a plurality of the features are able to be merged and if the at least one criterion is met, merging those features. The method further includes inputting the features, optionally after merging of features, into a classifier and training the classifier based on the input features and class labels assigned to the corresponding text sequences.

DETAILED DESCRIPTION

The exemplary embodiment relates to an automated system and method for features extraction which allows the transformation of an unwieldy collection of features into a reduced representative set of features capable of describing complex data with sufficient accuracy.

The exemplary method of features extraction includes mining the dataset for the frequent patterns and selecting those most relevant to the classification task. The method is driven by very few parameters, all being easily controlled by the user. These parameters may include the list of separators and the minimum support threshold. The exemplary method includes feature generation, feature selection and feature fusion steps, which are described in greater detail below.

The system and method find application in the context of processing images of layout-oriented and semi-structured documents, such as business cards, forms, mail addresses, medical records, identification cards, such as drivers' licenses, book and technical article information, such as author, title, ISBN number, publisher, dates, and the like, which are expected to contain text sequences that can be assigned to appropriate ones of a limited set of data types. Exemplary applications of the method include document analysis, recognition, and conversion.

The document images processed by the system can be scanned images of hardcopy documents or layout-oriented documents available in electronic format. Electronic documents may include noise as a result of inconsistent segmentation (e.g., in the case of Web pages) or as result of conversion (from PDF format for example). The exemplary embodiment is of particular benefit in feature extraction from noisy documents where both content noise (OCR errors) and structural noise (segmentation errors) make the task of feature selection difficult, particularly when document sequences are under- or over-segmented.

In various aspects the method employs one or more of:

1. Extracting frequent and contiguous patterns from noisy documents.

2. Flexible generalization of textual sequences capable of adjusting to the noise level.

3. Composition of compound patterns from textual and generalized patterns with no additional dataset scans.

4. A sampling method for pattern extraction from overly large datasets.

5. A method for merging the complementary frequent features.

Figure 1:
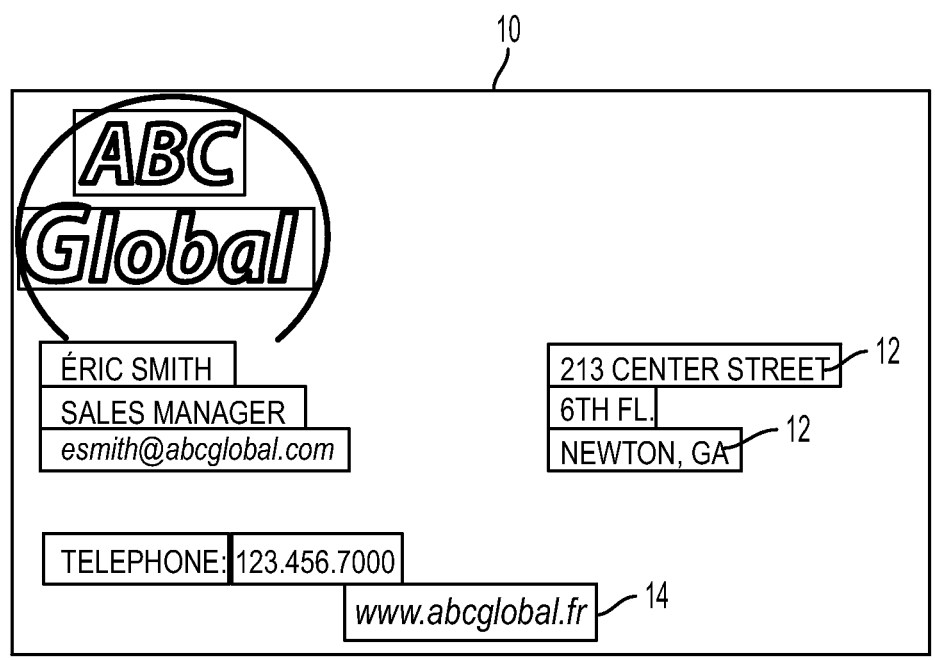
FIG. 1 is a schematic view of a business card image.

FIG. 1 illustrates an exemplary scanned image 10 of an original document, such as a business card, in which text sequences 12, which could be extracted from the business card by OCR and segmentation, are shown in respective bounding boxes 14. It is to be appreciated that in some cases, the scanning may result in over- or under-segmentation such that segmented text sequences do not correspond exactly to the data fields and that content error may also result.

The personal information content of business cards typically include personal name, job title, affiliation (such as a company name, university name, organization, or the like), business address information, business telephone number, business facsimile number, e-mail address, and so forth, arranged in lines of text, and may also include a graphical affiliation logo (such as a corporate logo, university logo, firm logo, and so forth). A given business card may include only some of these items or all of these items, and may include additional or other information. To make use of the information, it is desirable to extract the information and automatically assign an appropriate label from a set of labels to extracted segments, particularly text sequences, but graphical elements, such as logos, may also be extracted assigned a label.

Each extracted text sequence can be considered to include one or more patterns. A pattern can be any description of its content, from the highly specific to the general, such as the Roman letters and/or numbers the textual element contains, its length, the inclusion of non-Roman characters contained, and so forth. The number of possible patterns which can be used to describe a set of text sequences is virtually limitless, particularly when the documents from which the textual elements are extracted are noisy. The exemplary method allows a set of features to be extracted from these patterns which are relevant to a classification task, without being redundant. The set of features can be used by a classifier to learn a model which can then be used to label text sequences with appropriate class labels. Each feature in the set can be a pattern or a combination of two or more patterns generated by merging. In the examples herein, the patterns are described in the Python language, however, it is to be appreciated that other computer recognizable representations of the patterns and features may be employed.

Table 1 illustrates OCR-ed and extracted information from the business card image of FIG. 1.

TABLE 1

| RAW DATA | LABEL |
|---|---|
| ABC | |
| GLOBAL | |
| GRIO SMITH | Name |
| 213 Center Street | Street |
| Sales Manager | Role |
| 6r FI. | |
| esmith@abcg lobal.com | e-mail |
| Newtown, GA | City, State |
| 123.456.7000 | Phone |
| www.abcglobalfr | url |

To demonstrate the problem of selecting features which are capable of being used for accurately assigning a class label to noisy text sequences, consider the recognition of noisy e-mail addresses. Correct e-mail sequences, due to their automatic recognition by mailers, DNS and network routers, should follow certain rules. A regular expression in the Python language which captures any valid, real e-mail address may be of the general format:

$$\char`\^.+@[\char`\^\backslash.].*\backslash.[a-z]\{2,\}\$ \quad (1)$$

where:

'^' matches the start of the string,

'.+' matches 1 or more characters except a new line,

'[^\.]' matches any character except '.',

'*' indicates 0 or more repetitions of the preceding expression,

'.*' matches 0 or more characters except a new line,

[a-z] indicates that any lowercase letter of the twenty-six letter Roman alphabet is acceptable, {2,} indicates that there are at least two such letters (in general, { } is used to indicate a number of the immediately preceding expression, with two numbers being used where maximum and minimum are specified, such as {2,4}), \$ matches the end of the string.

The above expression thus reflects the fact that domain names can contain any foreign character, as well as the fact that anything before '@' is acceptable. The only Roman alphabet restriction is in the domain field and the only dot restriction is that the dot cannot be placed directly after '@'.

The expression is very general, however an error may make an e-mail sequence unparsable. For example, in OCR processing of scanned e-mail addresses, spaces may be inserted between characters, or characters may be erroneously replaced with ones which do not obey the general expression, as illustrated in Table 1. Table 2 shows several examples of text sequences from scanned business cards, where erroneous e-mail sequences are ubiquitous and can vary from almost correct to fairly unreadable ones.

TABLE 2

| Example | Content sequences | Parse | $RE_1$ | $RE_2$ | $RE_3$ |
|---|---|---|---|---|---|
| 1 | rigon@lan.de | yes | — | ✓ | ✓ |
| 2 | rapfel@smith.umd.edu | yes | — | ✓ | ✓ |
| 3 | avar@xgi .world.xerox.com | no | ✓ | ✓ | ✓ |
| 4 | g.jones@abcg lobal.fr | no | — | ✓ | ✓ |
| 5 | charles_smith isg roup.com | no | ✓ | — | ✓ |
| 6 | tim.cookvol com | no | — | — | ✓ |

In Table 2, "parse" indicates whether or not the sequence is recognized as being an e-mail address using the expression (1) above.

Other regular expressions for identifying e-mails suffer similar limitations. For example, consider the three following regular expressions for finding e-mail like patterns in text sequences:

$RE_1$="\.\bcom\b": is 1 if the text contains the '.com' substring.

$RE_2$="\@\b[a-z]{3,5}": is 1 if a text contains '@' followed by 3 to 5 lower case characters in the a-z range.

$RE_3$="\b\w\.\w\b", checks for the presence of two alphanumeric strings separated by a dot.

In these expressions

\w matches an alphanumeric string,

\b matches an empty string at the beginning or end of a word.

The three features in these expressions each have a different generalization level, with $RE_1$ being very specific and $RE_3$ being the most general. In cases when expression (1) fails to identify an e-mail pattern (lines (3) to (6) in Table 2), these three more general patterns give partial evidence for recognizing the strings as (erroneous) e-mail addresses.

Unlike e-mails, other typed data, like telephone/fax numbers, addresses etc., follow not one, but multiple different patterns and often assume human processing and understanding. When data heterogeneity is combined with data noise, the recognition task becomes even more difficult.

Methods of statistical learning can partially remedy the problem. Using a training set, these techniques can learn a model which uses partial evidence in order to measure the uncertainty and classifies an unparsable sequence as being more likely, for example, a (corrupted) e-mail address than an IP address. This however requires an appropriate abstraction of content and extracting features that give partial evidence for making a classification decision. Yet, feature extraction that tolerates a certain error/noise level is as difficult as writing advanced recognition rules.

The exemplary embodiment provides a method capable of automatically mining the dataset for patterns that tolerate 1) a certain noise level and 2) serve as relevant features in training accurate learning models.

Figure 2:
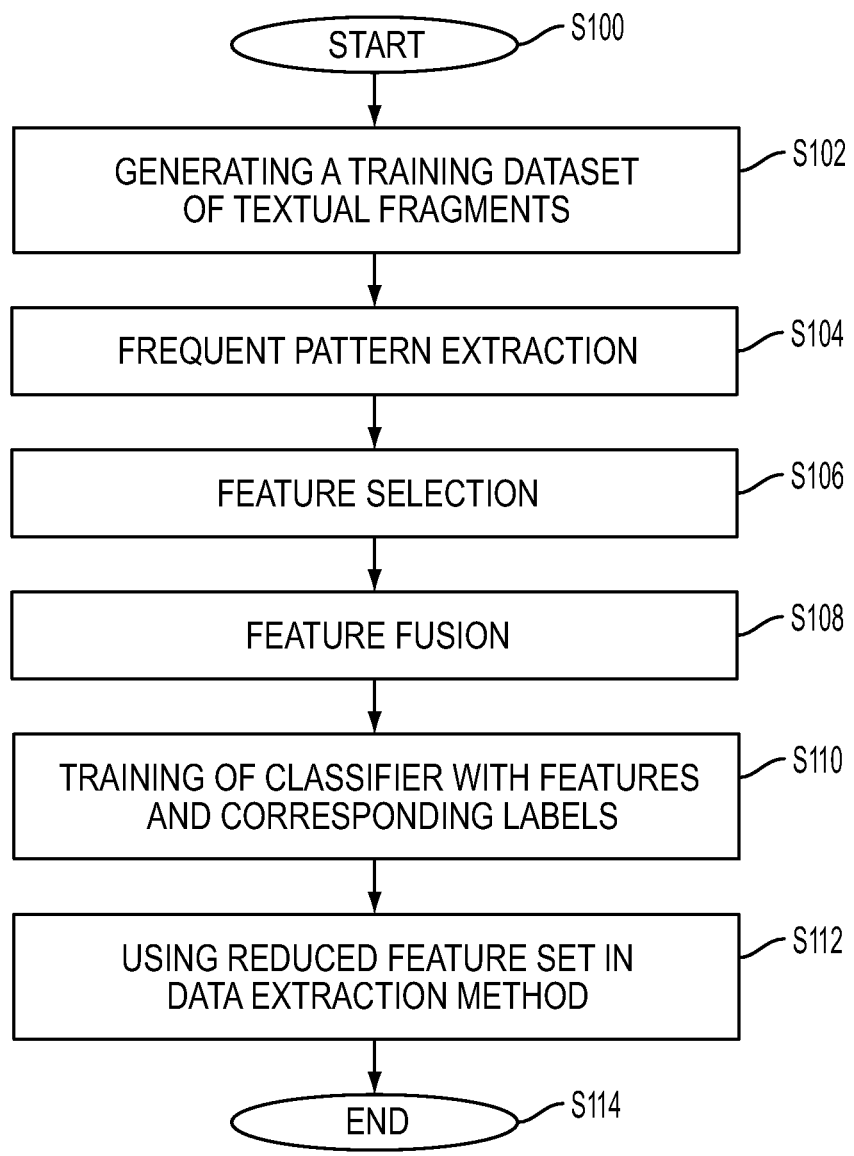
FIG. 2 illustrates a method of generating a features set from a patterns extracted from text sequences of document images, such as the image of FIG. 1.

FIG. 2 illustrates an exemplary computer implemented method for extraction of features. The method begins at S100.

S102: Generating a training dataset of textual sequences. This step may include preprocessing steps, such as OCR scanning of documents in a training set of documents and segmenting the scanned documents to generate a large dataset of text sequences.

S104: Frequent pattern extraction: the input dataset is mined in the unsupervised mode, in order to extract frequent patterns from the dataset of text sequences, i.e., without consideration of labels applied to the text sequences. The patterns may include both exact sequences/subsequences as well as their generalization as regular expressions allowing the possible noise to be conveyed. This step may include substeps of a) automatic generation of a large set of patterns from the text sequences and b) automatic selection of a reduced set of the patterns based on their frequency of occurrence.

This step is specific to layout-oriented and semi-structured documents. It relies on the sequential nature of textual sequences, and the generalization of noise in such documents.

S106: Feature selection: the number of frequent patterns identified in S104 may account or thousands or more patterns. For a given classification task, at least a part of the generated patterns is either irrelevant and/or redundant. In the exemplary embodiment, a scalable method is employed for selecting an optimal feature set from the patterns identified in S104, in the supervised mode.

This step is applicable to any dataset, it selects a subset of relevant features for building robust learning models.

S108: Feature fusion: this step allows a further reduction in the number of features to be used for classification. In this step, groups of two or more complementary features are identified and each group replaced by one, merged feature.

The feature fusion step is optional. It has the same general goal as feature selection since it allows a speed up of the learning process and improves the model accuracy.

S110: classifier training: groups of the reduced set of features and their associated corresponding data type (class of textual elements) can be input to a classifier to train the classifier. The trained classifier is thus able to assign class labels to documents and/or unlabeled extracted text sequences in input documents, based on the text sequences. The text sequences may be the same or different from those used in training. In other embodiments, the groups of features may be provided to a human operator for generating a set of rules for identifying a class or classes of data elements.

S112: classification of unlabeled text sequences/documents. The trained classifier is used to label new documents/text sequences.

The method ends at S114.

The exemplary method provides for automatic feature extraction from layout-document and semi-structured documents, in the presence of both content and structural noise. The method is based on mining the documents and requires no special preprocessing nor domain knowledge. In the unsupervised mode, the method extracts the frequent feature set (S104). In the supervised mode, it proceeds to determining the optimal feature set (S106, 108). Test results show that the method's performance is comparable or superior to the manual work on patterns and rule writing accomplished by a domain expert.

Steps of the method will now be described in greater detail.

Dataset Input (S102)

The documents 10 used for training are intended to be representative of the documents which the trained classifier system is intended to process and includes as wide a variety, as possible of such documents. For example, the training set may include at least 100, and in some embodiments, at least 1000 such documents.

The input dataset (sequences 12) consists of segmented text sequences which may each be generated by one or multiple preprocessing steps, such as scanning an original hard-copy document, format conversion, OCR recognition of textual content, logical analysis, and ultimately segmentation, which is the identification of text fragments by identifying lines of text, consideration of white space and differences in font type and/or size, as segment separators, and the like. The data set reflects the errors which may occur in the preprocessing steps.

The text sequences extracted from the documents in the training set are each labeled, e.g., manually, with a class label corresponding to a class of data element to which the text sequence should properly be assigned (even though it may contain errors). The labels may be in the form of XML tags.

In some cases, the input documents may be stored in an Extensible Markup Language (XML) format where the document may be considered to have a tree structure with nodes. Documents in PDF format can be converted to HTML structure. A bounding box 14 is provided for the text sequences, reducing the effects of inter-segment noise. For each XML node, the content associated with it is extracted, and additionally the class label, if available. Additionally, for any given node its neighbors in the XML structure are extracted, such as its parent, child and/or sibling nodes. The neighbor's content assists in generating complex features conditioned by the neighborhood relationship.

Extraction of Frequent Patterns (S104)

The text sequences from the noisy documents input at S102 are mined for frequent patterns. The following considerations may be addressed in the extraction:

1. Frequent and contiguous factual patterns are extracted. These are basic patterns which are factual fragments occurring k times (the minimum support) in the dataset. The value of k may be selected based on the size of the dataset, for example, k may be 5 or 8 or the like. Additionally, unlike the conventional pattern mining, the patterns extracted are contiguous. A factual (basic) pattern represents a single, contiguous fragment, i.e., part or all of a text sequence, which is not generalized so as to read on a plurality of different fragments. Each occurrence of a factual pattern may be stored as a tuple (i.e., a set of ordered elements) of the form <featureID, (b,e)>, where "featureID" corresponds to a unique identifier that denotes a feature. The identifier can be the characters that makeup a word such as "Fax" in the case of word features or a unique number that can be used to retrieve the feature when stored in a database. The locator "(b, e)" represents the location of the beginning and end characters in the document from which it was extracted.

2. Generalization and composition. In this step, the factual patterns are generalized in order to convey the content and structural noise. The generalization occurs on different levels and captures the larger classes of sequences. More complex patterns are composed by extension of simpler patterns.

3. All potential patterns form a complex lattice whose size grows exponentially in the number of basic elements. Naive approaches to finding the set of frequent patterns on the lattice may have a prohibitive complexity. In one embodiment, an efficient method which excludes multiple scans of the dataset when composing new patterns is proposed. The method works well when the dataset fits in the main memory where the evaluation can be quickly done. In the case of a large dataset, a sampling technique is proposed. In this approach, documents are sampled from the dataset, the feature extraction is applied on the sample, and then an estimation, such as use of the Chernoff bounds (which takes into account the probability of two patterns occurring together based on their respective occurrence probabilities), is applied to estimate the pattern frequency in the entire dataset.

Pattern Extraction Algorithm

An exemplary algorithm for extracting frequent patterns from noisy documents will now be described. The algorithm works in a recursive manner and copes with the following sets of patterns:

1. Separator set. A set of separators is defined. Separators split textual sequences into tokens. By default, the separator set may include standard separators like a blank space, '\n', which indicates the end of a line, '\t', which indicates a TAB character, ',', and the like. Additionally, the separator set can be extended or reduced to accommodate specific syntactic patterns in the dataset. For example, since periods '.' and slashes '\' are typically used in e-mail addresses, URLs, and sometimes in telephone numbers, these are not considered as separators in processing business cards.

2. Factual patterns. Using the full dataset of textual sequences, the generator extracts the factual elements that occurred at least k times:

1) the set of all alpha-numeric tokens, like 'Fax', 'PhD', 'email', etc. (This may be performed using a pattern of the form '\b\w+\b' in the Python language, which means a single character string of alpha-numeric characters that is separated from other text and with no internal separators, such as spaces);

2) the set of non alpha-numeric character sequences between two separators (e.g., using the pattern '\b\W+\b' in Python, which means a string of non alphanumeric characters between white spaces).

3. Generalized patterns. According to the flexible generalization, an upper-case character, lower-case character, and a digit are generalized as [a-z], [A-Z] and [0-9], respectively. Numbers in brackets { } refer to the length as the repetition of the basic pattern. Thus, the words 'fr' and 'Phone' are generalized as '[a-z]{2}' and '[A-Z][a-z]{4}', respectively Next, there may be generalization on the length which gives patterns like [a-z]{3,5}, [A-Z]+, [0-9]+, [A-Za-z]+, etc. where '+' represents 1 or more repetitions. The set of factual and generalized patterns form the basic pattern set P.

The method allows for different levels of generalization from factual patterns, including alphabet enlargement, frequency extension, or both. For the textual pattern 'Phone', the generalized patterns may include one or more of the following:

[A-Z][a-z]{4} (meaning a capital alphabet character followed by four lower case alphabetic characters),

[A-Za-z]{5} (meaning any combination of upper case and lower case alphabetic characters in any order in a string of 5),

[A-Z][a-z0-9]{4} (meaning a capital letter followed by four lower case alphabetic character and/or digit), \w{5} (meaning any five alphanumeric characters immediately following a separator), \w+ (meaning any length of alphanumeric characters immediately following a separator).

No basic or generalized patterns can match the empty string. Nor is a pattern acceptable if it matches every text sequence. A pattern may have multiple matches in the dataset. With each match, the pair (b,e) is associated, which indicates the starting and end positions of the match.

4. Compound patterns. A compound pattern is a concatenation of two or more basic patterns. Compound patterns occurring at least k times in the documents are automatically retrieved. Additionally, using lists B and E of start and end positions (b,e) for all basic text patterns, a recursive algorithm which determines all frequent compound patterns is applied.

The frequent pattern generator calls Algorithm 1 on each basic pattern patt∈P. It gains from the regular pattern match on arbitrary strings, according to which match($p_1$,d)=(a,b) and match($p_2$,d)=(b+1,c) implies match(Concat($p_1$, $p_2$),d)=(a,c), where $p_1$ and $p_2$ are patterns in an input document d. The algorithm tries to compound a new pattern by checking whether the ending (e) position of a current pattern is followed by the beginning (b) position of a basic one. The algorithm may be a recursive algorithm represented as follows:

---

Algorithm 1 Find all frequent patterns starting with a given pattern

Require: cur - current pattern, P- the set of basic patterns
Ensure: RES - all frequent patterns prefixed with cur
1: RES: = ∅
2: Let E = {$e_i$} be the set of terminal positions of cur
3: for all patt ∈ P do
4:   Let B = {$b_j$} be the set of starting positions of patt
5:   match := { ($b_i$,$e_j$)|$e_i$ + 1 = $b_j$,$b_i$ ∈ B,$e_j$ ∈ E }
6:   if |match| > k then
7:     new := concat(cur, patt)
8:     RES := RES ∪new∪ Algorithm1(new)
9:   end if
10: end for
11: return RES

---

The set P of the basic patterns can be extracted by a single (one time) scan of the dataset. Extra scans of the dataset to identify compound patterns are not needed, as the compound patterns which are not already present k times can be built from the start and end information for the basic patterns. For each new compound pattern new, its boundary sets of B and E are obtained from its components.

Figure 3:
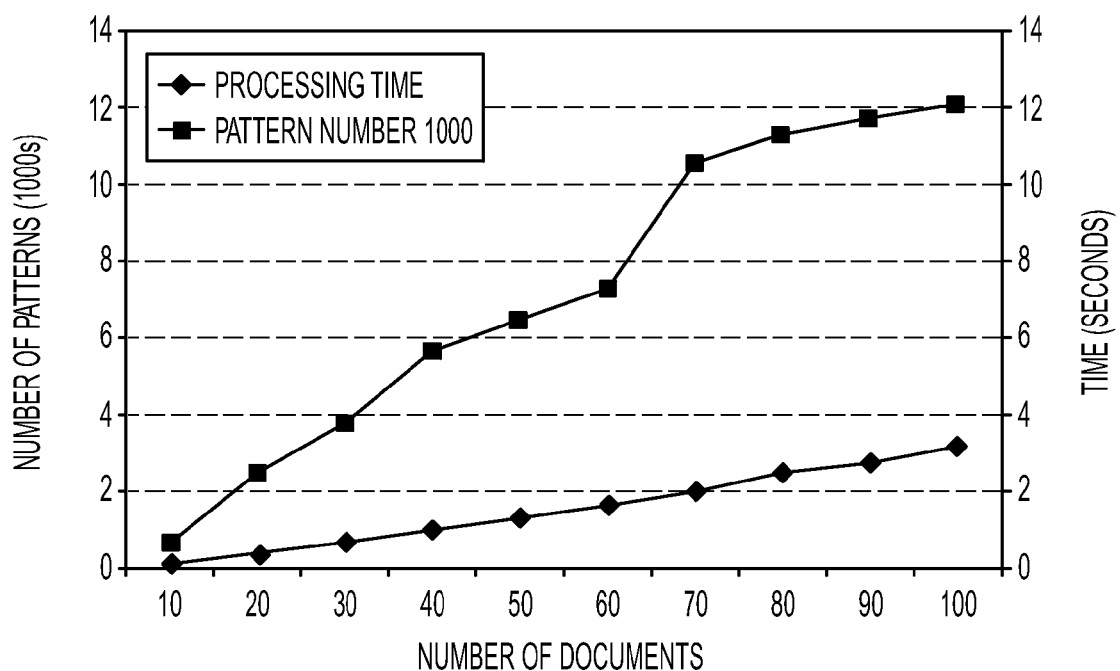
FIG. 3 illustrates plots of processing time and number of extracted patterns (in thousands) vs. number of documents in a collection of business card documents.
Figure 4:
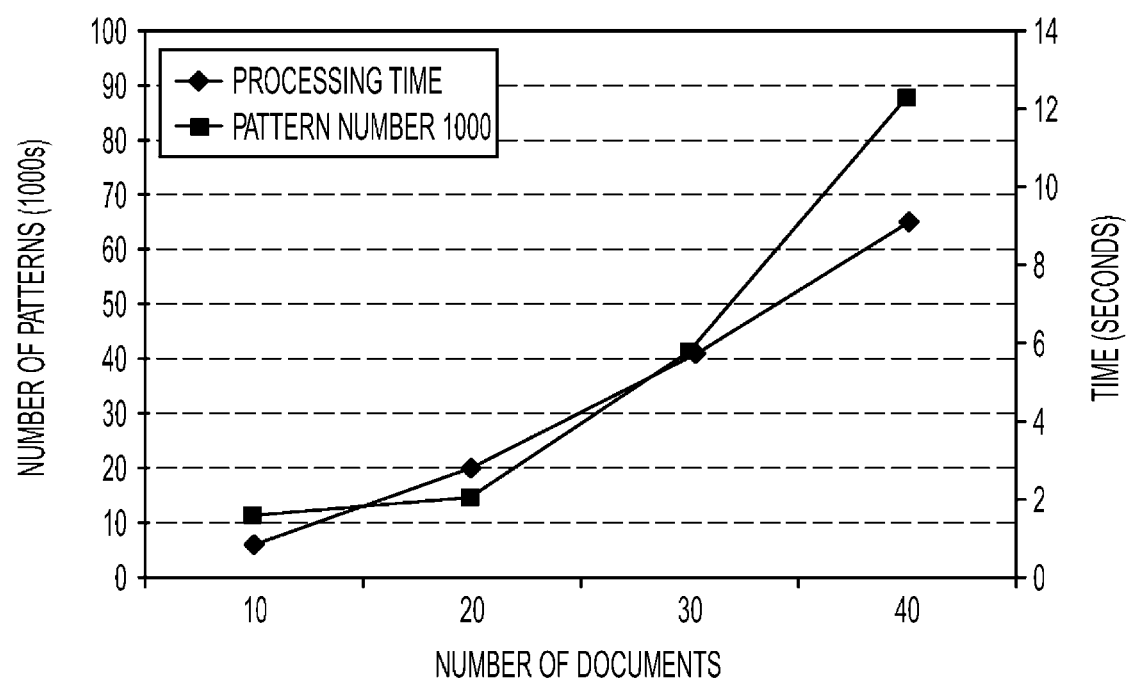
FIG. 4 illustrates plots of processing time and number of extracted patterns (in thousands) vs. number of documents in a collection of medical record documents (CPO dataset)

By way of example FIG. 3, is a plot of two measures of the feature generation: processing time (in seconds) and number of frequent patterns (in thousands), vs. number of documents occurrences for a dataset extracted from business cards (hereinafter BizCard collection). FIG. 4 shows corresponding results for a document collection with metadata annotation (CPO dataset, created in the Virtual Information Knowledge Environment Framework (VIKEF) (see, http://www.vikef.com).

The exemplary feature generation method prunes off the infrequent patterns and excludes any extra scans of the dataset to find compound patterns.

In some cases, the match in line (5) of Algorithm 1 may be prohibitive (computationally expensive) if 1) the dataset is too large; 2) the size of lists E and B are comparable to the size of dataset; or 3) the length of frequent compound patterns is getting too long. In such cases, a sampling technique may be used in which only a portion of the data set is analyzed for compound patterns, as described below. It should be noted that Algorithm 1 can alternatively or additionally be adapted to limit the length of compound patterns to solve the third problem.

Sampling Techniques for Large Datasets

If the dataset is too large, a sampling technique may be employed to obtain a quick estimation of the frequent pattern set, where additional checks can be performed to finalize the pattern set. In order to obtain an estimation of the frequent patterns without examining the entire dataset, the additive Chernoff bound may be used for testing a hypothesis based on the sum of observations to estimate the range of the pattern match from a sample with a high statistical confidence (see, for example, the Wikipedia article at http://en.wikipedia.org/wiki/Chernoff_bound).

Let X be a random variable whose spread is R. Suppose that there are n independent observations of X, and the mean is $\mu_n$.

The Additive Chernoff bound states that with probability 1−δ, the true mean μ of X is within $\mu_n - \epsilon \leq \mu \leq \mu_n + \epsilon$, where $$\varepsilon = R\sqrt{\frac{\ln(1/\delta)}{2n}}. \quad (2)$$

The Chernoff bound estimation is applied to the frequent pattern sampling as follows. Given a set S of n sample observations and the minimum support k, a pattern p is considered frequent, with probability 1−δ, if $k \leq \mu_n - \epsilon$ and is infrequent with probability 1−δ if $\mu_n < k - \epsilon$, where $\mu_n$ is the pattern match in the sample data S. Ambiguous patterns are those whose matches in the sample satisfy $k - \epsilon < \mu_n < k + \epsilon$. These patterns remain undecided and may be subjected to further examination, e.g., by analysis of the entire data set (or they may be simply added to the frequent set of patterns or excluded by adding them to the infrequent set of patterns).

The Chernoff bound is independent of the probability distribution that generates the observations X, as far as such probability distribution remains static. The number of ambiguous patterns highly depends on the value of ε, which itself is a function of the sample size n. In order to further reduce ε, the most restricted spread R for the match of each compound pattern is derived. Following the Apriori (monotonicity) property, the match of a compound pattern is always less than or equal to the minimum match of each basic pattern in it. (See, e.g., Bart Goethals. Survey on frequent pattern mining. HIIT Basic Research Unit. Department of Computer Science. University of Helsinki, 2003).

The sampling method for frequent patterns may proceed in the following manner:
1. While scanning the entire dataset D, take a random sample $D_S$ and find matches $M_D(p)$ and $M_{DS}(p)$ for each basic pattern p∈P in D and $D_S$.
2. Identify the frequent pattern set $F_S$ on the sample set $D_S$ using Algorithm 1 and basic pattern matches in $D_S$, with a minimum support $$k' = k\frac{|D_S|}{|D|}.$$

3. For each compound pattern cp∈$F_S$, estimate its expected value $$\mu = \frac{|D|}{|D_S|}\mu D_S$$

and the Chernoff bound ε on the entire dataset D with $R = \min_{p \in cp} M_D(p)$.

4. Select frequent compound patterns with $\mu - \epsilon > k$. Optionally, verify the ambiguous patterns on the entire dataset.

By way of example, some of the 187 frequent patterns that start with the basic pattern "http" extracted from the BizCard collection are shown below:

http
    http:
    http://
    http://[a-z]+
    http://[a-z]+.

http://[a-z]+.[a-z]+
    http://[a-z]+.[a-z]+.
    http://[a-z]+.[a-z]+.[a-z]+
    http://[a-z]+.[a-z]+.[a-z]+.
    http://[a-z]+.[a-z]+.[a-z]+.[a-z]+
    http://[a-z]+.[a-z]+.[a-z]+.[a-z]
    http://[a-z]+.[a-z]+.[a-z]+.[a-z]{2}
    http://[a-z]+.[a-z]+.[a-z]+.[a-z]{3}
    http://[a-z]+.[a-z]+.[a-z]+.com
    ...
    http://www
    http://www.
    http://www.[a-z]+
    http://www.[a-z]+.
    http://www.[a-z]+.[a-z]+
    http://www.[a-z]+.[a-z]+.
    http://www.[a-z]+.[a-z]+.[a-z]
    http://www.[a-z]+.[a-z]+.[a-z]{2}
    http://www.[a-z]+.[a-z]+.[a-z]{3}
    http://www.[a-z]+.[a-z]+.[a-z]+
    http://www.[a-z]+.[a-z]+.com
    ...

All of these are compound patterns, except the first.

Figure 5:
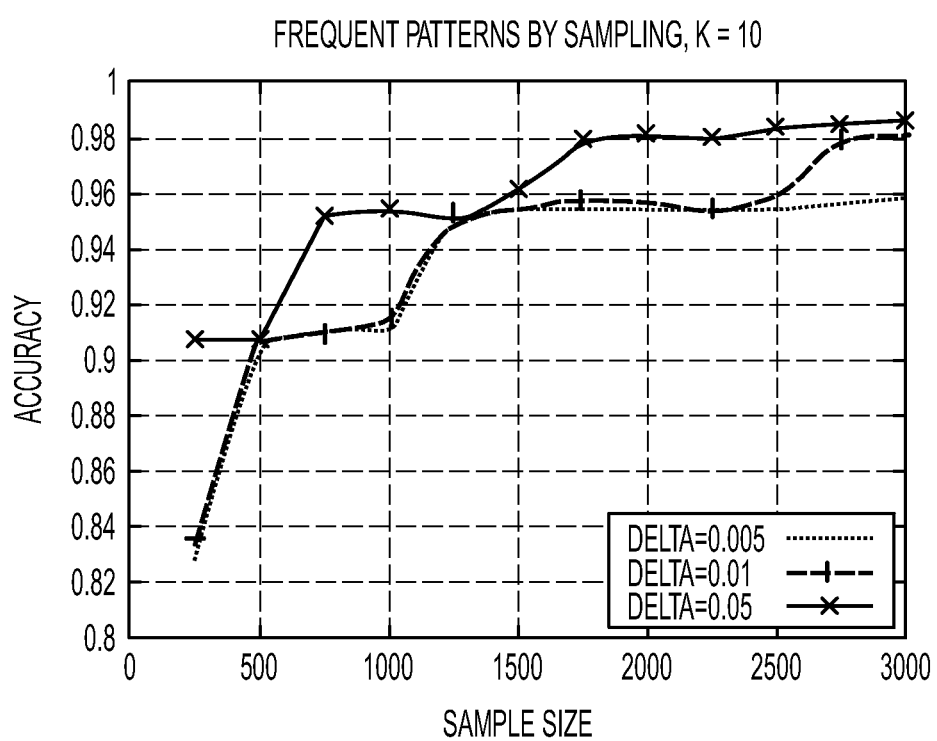
FIGS. 5-7 illustrate labeling accuracy vs. sample size for different values of statistical tolerance $\delta$ (from 0.005 to 0.05) and threshold (minimum support) k of 10 (FIG. 5), 25 (FIG. 6), and 50 (FIG. 7) for frequent patterns identified by a sampling method.
Figure 6:
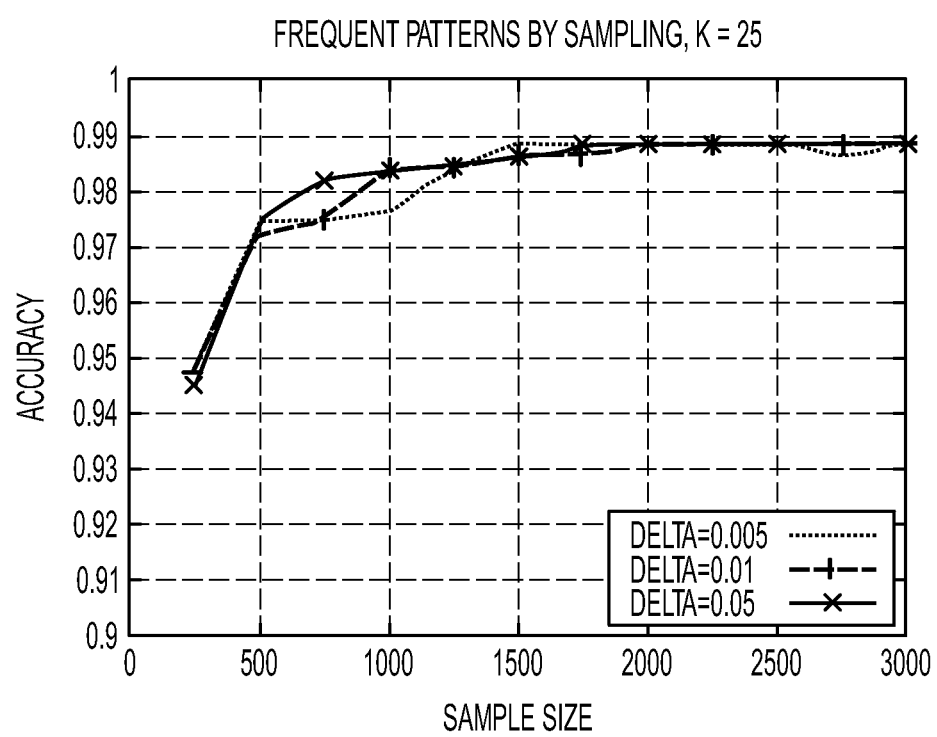
Figure 7:
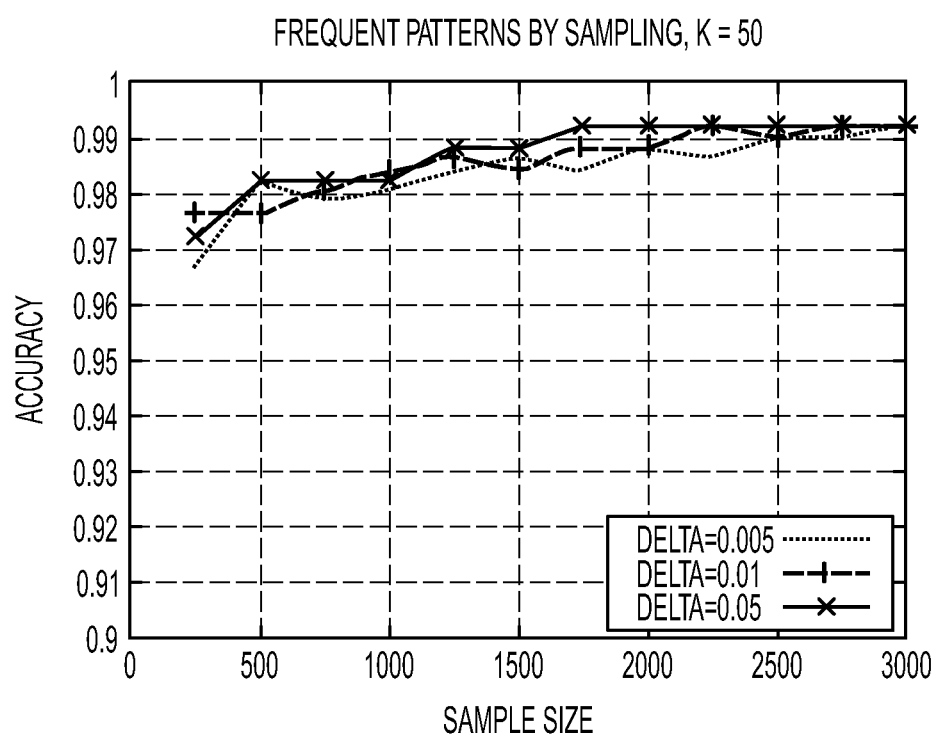

The accuracy A of a sampling scheme can be measured by the percentage of correct decisions on patterns. For example, accuracy A is given by the expression:

$$A = \frac{a+b}{T},$$

where a and b are the number of correctly detected frequent and infrequent patterns, respectively, and T is the total number of patterns. The quantity 1−A refers to the percentage of misclassified and ambiguous patterns. FIGS. 5-7 show the results of an evaluation of the frequent pattern sampling on the BizCard collection. FIGS. 5-7 report the accuracy A for different values of statistical tolerance δ (from 0.005 to 0.05) and threshold (minimum support) k of 10, 25, and 50, respectively. The dataset included about 4000 elements (observations). Sampling was run with values of n between 250 and 3000.

These results indicate that it is not necessary to use high values of k, when the sample size is reasonable (n is at least 500) in order to give good accuracy.

Feature Selection (S106)

While the pattern mining step is unsupervised (S104), the feature selection step filters the set of patterns (candidate features) by identifying a subset of the patterns that are more useful in predicting the correct class label of a text sequence from which the pattern is extracted.

A. Pruning Irrelevant Features (S106A)

For the feature selection, a method based on the entropy-based uncertainty of a random variable can be used to filter out the less relevant features. The entropy of a variable Y is defined as $H(Y) = \Sigma_y P(y) \log_2 P(y)$. Given two random variables Y and X, the conditional entropy H(Y|X) is the entropy of Y after observing values of X:

$$H(Y|X) = \sum_x P(x) \sum_y P(y|x) \log_2(P(y|x)), \quad (3)$$

where P(x) is the prior probabilities for X values, P(y|x) is the posterior probabilities of y∈Y given the values of x∈X. In the present case, the information that one variable gives about another is of interest. When applied to feature selection, the mutual information is the amount by which the entropy of one variable decreases, which provides information about the other variable. The symmetrical uncertainty defined as:

$$SU(Y, X) = \frac{2H(Y) - H(Y \mid X)}{H(Y) + H(X)} \quad (4)$$

which is symmetrical for two random variables Y and X. Equation (4) normalizes values of the symmetrical uncertainty to the range [0, 1], where the value SU(Y,X)=0 indicates that Y and X are independent (that is, not relevant to one another) and the value SU(Y,X)=1 indicates that the value of either one completely predicts the value of the other (and vice versa, that is, the variables Y and X are highly relevant to one another).

The symmetrical uncertainty SU(Y,X) may be used as a measure of relevance of features in the exemplary embodiment where Y represents a target one of a set of class labels and X represents one of a set of features having that class label. For example, the features which yield values of SU(Y, X) which are below a threshold value $SU_t$ are pruned, leaving a reduced set of features with relatively higher values of symmetrical uncertainty for the particular class label than those pruned.

Symmetrical uncertainty is one way for assessing relevance of features. Other methods for identifying relevant features to be retained in the reduced set are also contemplated. An efficient feature selection method should cope with both irrelevant and redundant features. The set of features may be further or alternatively reduced by removing redundant features, as described below.

B. Pruning Redundant Features (S106B)

Redundant features may be filtered out by applying a Markov blanket to the reduced set obtained in S106A.

In the present case, let a dataset D have a feature set F and a set of class labels Y. A relevant feature $F_i \epsilon F$ is considered redundant if it has a Markov blanket in F, where a Markov blanket $M_i$ for feature $F_i$ is a subset of features $M_i \epsilon F$, where $F = \{F_1, F_2, \ldots F_i, \ldots F_n\}$, which subsumes the information that feature $F_i$ has about target Y and all other features in $F - M_i - \{F_i\}$:

$$P(F-M_i-\{F_i\}, Y|F_i, M_i) = P(F-M_i-\{F_i\}, Y|M_i) \quad (5)$$

The Markov blanket filtering is a backward elimination procedure, which at any step removes $F_i$ if there exists a Markov blanket for $F_i$ among the features remaining in F. The process guarantees that a feature removed in a previous iteration will be still redundant later and removing a feature at later steps will not render the previously removed features necessary to be included in the optimal subset $F_{opt}$.

However, finding the exact Markov blanket for a feature may entail an exhaustive enumeration of feature subsets which makes the exact Markov blanket filtering of Eqn. 5 computationally undesirable for any important feature set. Accordingly, scalable filtering algorithms, which approximate the Markov blanket filtering, may be used. Similar to the exact feature subset selection, where only relevant features having no Markov blanket are selected, in the approximate feature subset selection, one selects the relevant features having no approximate Markov blanket.

One suitable scalable technique which may be used in the present method is Fast Correlation-Based Filtering (FCBF), which is based on determining the correlations between features. It calculates the SU values for all features F and proceeds with the following two major steps: First, it selects relevant features, by keeping features with a threshold value $SU_t$ which may be a user-selected threshold value. Second, it removes redundant features, by checking if a given feature of a feature set is highly correlated with one of more features from the same set.

Since FCBF is designed for binary class problems, an extended version of the FCBF may be employed to cope with multiple class tasks (see above-mentioned U.S. application Ser. No. 12/107,875 for more details).

Further details on Markov blankets and scalable features are to be found in; Lei Yu and Huan Liu. Efficient feature selection via analysis of relevance and redundancy. J. Mach. Learn. Res., 5:1205-1224, 2004; and D. Koller and M. Sahami. Toward optimal feature selection. In ICML '96: Proc. 13th International Conference on Machine Learning, pages 284-292, San Francisco, Calif., USA, 1996. Morgan Kaufmann Publishers Inc.

Feature Fusion (S108)

The previous section presented methods of feature selection to cope with the irrelevant and redundant features. A further, optional step may identify complementarities among features and fuse complementary ones. For this step the notion of Markov's blanket can be applied to complementary features and the principle of approximate Markov blankets extended to the feature fusion step. For this step, two features $F_1$ and $F_2$ may be considered complementary if their replacement with their disjunction $F_1 \vee F_2$ does not have a negative impact on the classifier performance (i.e., the accuracy of text sequence labeling will not be adversely affected by allowing either of the features to be present rather than both). The feature merge reduces the number of features without a reduction in the information the features carry out about the target variable (the class label Y).

The following definition, which expresses the condition for feature merge in terms of symmetrical uncertainty SU, may be used:

Feature $F_1 \vee F_2$ is a Markov blanket for two features $F_2$ and $F_1$ if: $SU(Y, F_1) > SU(Y, F_2)$, $SU(Y, F_1 \vee F_2) > SU(Y, F_i)$ and $SU(Y, F_1 \vee F_2) > SU(Y, F_2)$.

Algorithm 2 is an exemplary algorithm which may be used for the feature fusion step.

---

Algorithm 2 Feature Fusion Method

---

Require: Set S of $F_i$ in the decreasing order of $SU(Y, F_i)$
Ensure: Set M of merged features
1: M := ∅
2: while no merge is possible do
3:    $F_{cur} := F_1$
4:    remove $F_1$ from set S
5:    for i := 1,..., |S| do
6:      if $SU(Y, F_{cur} \vee F_i) > SU(Y, F_{cur})$ and $SU(Y, F_{cur} \vee F_i) > SU(Y, F_i)$ then
7:        $F_{cur} := F_{cur} \vee F_i$
8:        remove $F_i$ from S
9:      end if
10:   end for
11:   add $F_{cur}$ to M
12: end while
13: return M

---

Algorithm 2 applies the above definition for merging complementary features. Although the algorithm is presented separately, it can be combined with the feature selection methods, like FCBF and its modified version, with no extra computational cost.

The fusion algorithm works with any feature set, but assumes that the features are binary. Beyond the feature number reduction, the feature fusion often improves the interpretability of patterns.

Some examples of patterns resulting from the feature fusion on the BizCard collection are as follows:
1. Director|Senior|Consultant|of|Engineer|Vice|
   Software|and|Leader|Member|Staff|
2. [A-Z]+[a-z]{6}|[A-Z]+[a-z]{8}|[A-Z][a-z]{8}|[A-Z][a-z]{12}|[A-Z]+[a-z]{12}|[A-Z]+&|&[A-Z]+| . . . .

The first fused pattern above means that if director or Senior or Consultant etc, is present, the same label is applied (title or role of a person). The second fused pattern combines a set of generalized patterns of alphabetic strings.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 2, can be used to implement the method for features generation.

The method illustrated in FIG. 2 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

Figure 8:
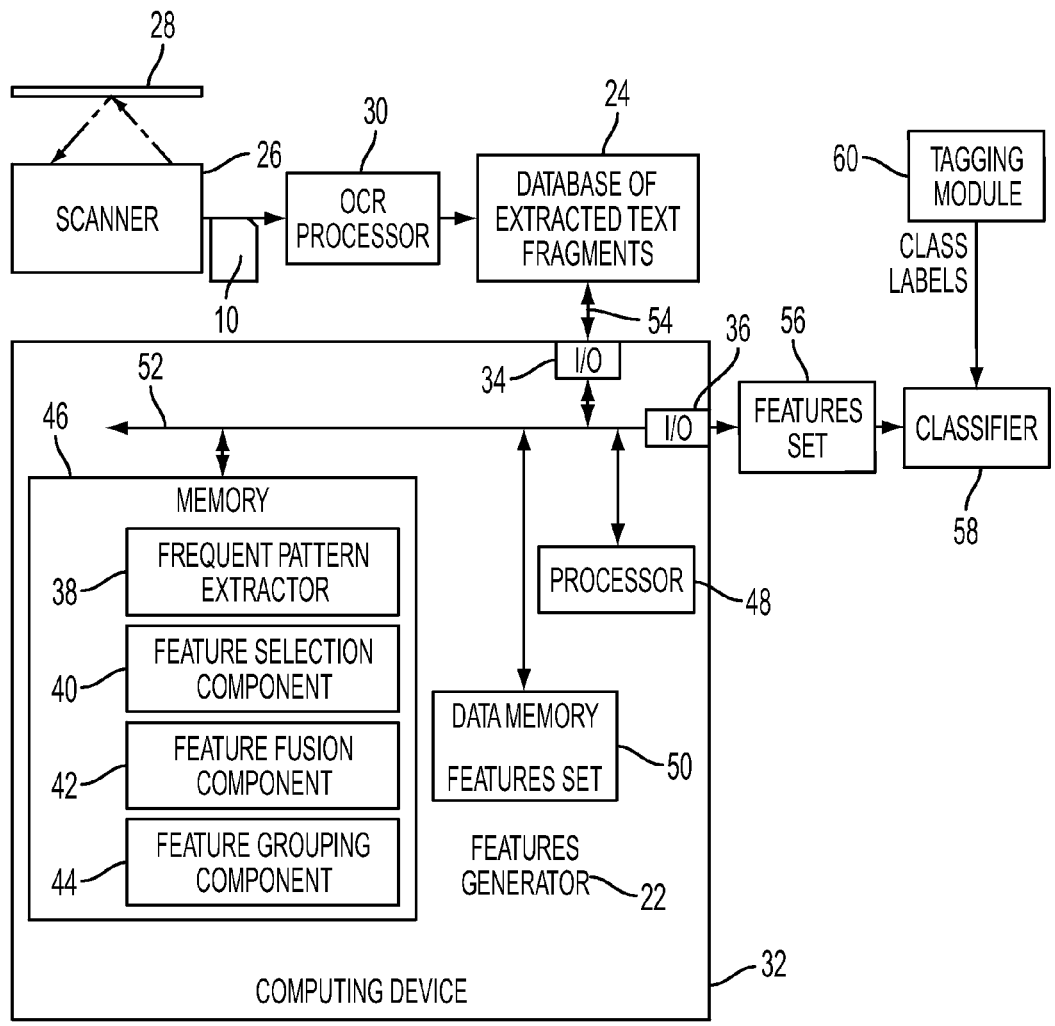
FIG. 8 illustrates an exemplary apparatus for features generation which may be used to perform the method illustrated in FIG. 2.

With reference to FIG. 8, an exemplary apparatus 20 for generating a set of features from a data set of extracted text sequences in accordance with the exemplary method is illustrated. The apparatus includes a feature generator 22, which includes or accesses a database 24 of extracted text sequences, which may be stored in associated memory. An image capture device 26, which may be incorporated into apparatus 10, or may be a separate device, captures an image 10 of a physical document 28, such as a business card, preprinted form with entries in data fields, medical record, publication or the like. The capture device 26 may be a digital camera, a scanner, a phone camera, or other device which provides a digital image of the physical document.

An OCR processor 30 receives the captured image 10 and processes it to identify text sequences. In particular, the OCR-processor segments the document into a set of text sequences, which may include over segmenting some data elements. The OCR processor outputs the text sequences which are stored in database 24 along with location information, such as the neighborhood of adjacent text sequences. The illustrated OCR processor 30 is shown as a separate element, however, it may be suitably incorporated into the scanner 26 or feature generator 22. The OCR processor may suitably include software for pre-processing of the acquired image 10, such as squaring of the image, re-sizing the image, performing a blurring correction, shadow correction, reflection correction, or other correction, converting the image to black-and-white, performing image compression, and the like. The OCR processor segments the image and extracts the text characters contained in the image and a a so provide layout and font information. The OCR module outputs a text file comprising text sequences, including their arrangement of characters, positions, and font sizes to the database. These may be combined to form a document representation of lines of text and separators. The OCR output may be encoded in XML or other markup language format. The OCR processor generally operates based on a pattern recognition algorithm or algorithms which identify characters based on matching with expected character shapes. Errors or uncertainty in the output of the OCR processing can be expected to occur due to various factors, such as: less than ideal match between a printed character and the expected pattern; non-optimal image quality; short or usual textual content such as names and addresses; difficult-to-match fonts having substantial flourishes or other artistic features; and the like. To resolve uncertainties, the OCR processor optionally utilizes additional information or post-conversion processing such as a spelling checker, a grammar checker, and the like. However, because the content of business cards and other forms typically includes personal names, addresses, e-mail addresses, and so forth that are not commonly found in dictionaries, and because the content of such images is typically not laid out in grammatically proper form, attempts to resolve uncertainties using dictionaries or grammar checkers may not be particularly effective.

In the exemplary embodiment, the feature generator 22 is hosted by one or more specific or general purpose computing device(s) 32, such as a server, general purpose desktop computer, laptop, portable digital assistant, the image capture device 26 and/or OCR processor 30. Or it may be hosted by a dedicated computing device designed specifically for performing the method. The computing device 32 may include an input 34 and an output 36, through which the computer communicates with external devices and which may be separate or combined. The feature generator 22 may include a number of processing modules 38, 40, 42, 44 which may be in the form of software, hardware, or a combination thereof. The exemplary processing modules are in the form of software for performing the exemplary method, which may be stored in main memory 46, which may be resident on the computing device or accessible thereto, and executed by an associated processor 48, such as a central processing unit (CPU) which controls the operation of the computing device 32. Particularly in the case of a general purpose computing device, the processing modules 38, 40, 42, 44 may be in the form of add-on software or hardware.

Features generated by the features generator may be stored in data memory 50, which may be the same or a separate memory from memory 46. Components of the features generator 22 may communicate by a data\control bus 52. In the exemplary embodiment, computer 30 is linked to the OCR processor and/or database by links 54, such as wired and/or wireless links which may form a network, such as a local area network or wide area network, e.g., the Internet. As will be appreciated, only a portion of the components which are incorporated into a computer system are shown in FIG. 8. Since the configuration and operation of programmable computers and computer networks are well known, they will not be described further.

The memories 46, 50 may represent any type of computer readable medium such as random access memory (RAM), read only memory (ROM), magnetic disk or tape, optical disk, flash memory, or holographic memory. Memories 46, 50 may be distributed throughout the system. In some embodiments, the processing modules and memory 46 may be combined in a single chip.

Captured images, OCR-processed data, and the like may also be stored in memory 50.

A first processing module 38 is a frequent pattern extractor configured for extracting frequent patterns from the input dataset, as described above for step S104. Module 38 may suitably include Algorithm 1.

A second processing module 40 is optionally a feature selection module configured for identifying features from among the frequent patterns which are both relevant and not redundant, using the methods outlined for step S106, above, such as Markov blankets.

A third processing module 42 is optionally a feature fusion module configured for identifying features which may suitably be combined without appreciably reducing the overall efficiency of the system, as described for step S108, above. Module 42 may suitably include Algorithm 2.

A fourth processing module 44 is optionally a feature grouping component. In the case where the extracted text sequences are already tagged with class labels, these may be associated with the respective features extracted from the text sequences so that a respective group of features is associated with each class label.

The reduced features set 56 may be output, e.g. to a classifier 58. The classifier learns a classification model which assigns class labels to new extracted text sequences based on their features. The classifier and its learned model may be stored in memory of the computing device 32 or in a separate computing or memory storage device.

The trained classifier 58 can in general be any type of multi-class classifier, such as a maximum entropy classifier, a support vector machine (SVM) classifier (extended to multiple classes), a neural network-based multi-class classifier, or the like. The classifier can employ any suitable algorithm to generate or train the trained classifier 58. The choice of multi-class classifier and of the training method may be made based on characteristics of the type of objects being classified, characteristics of the features, and so forth.

Optionally, the classifier includes a tagging module 60 which takes as input a new data set and associates candidate text sequences with class labels corresponding to the type of data they contain (e.g., e-mail, phone number, person name etc labels). The tagging module 60 may apply a maximum likelihood parse of the text sequences from a single document and assign the most appropriate label to each segment. The tagging module 60 can use various pieces of information in assigning tags to the text image segments in addition to the output of the classifier. For example, the first line and/or the line with the largest font size is often the name of the person whose information is conveyed by the card, while address information often starts with one or more numerals. The tagging module may be incorporated into the classifier or be a separate processing component and provide input to the classifier 58.

Methods of tagging are described, for example in the following references, the disclosures of which are incorporated herein by reference: John C. Handley, Anoop M. Namboodiri, Richard Zanibbi, "Document Understanding System Using Stochastic Context-Free Grammars," Proceedings of the Eighth International Conference on Document Analysis and Recognition, pages: 511-515 (2005); Salah Ait-Mokhtar, Jean-Pierre Chanod, Claude Roux, (2001). "A Multi-input Dependency Parser," in Proceedings of the Seventh International Workshop on Parsing Technologies Beijing, China 17-19 Oct. 2001 (IWPT-2001); and U.S. Pat. No. 7,058,567, incorporated herein by reference in its entirety. Exemplary technologies that can be applied in the tagging stage are stochastic context-free grammars, the Xerox Incremental Parser (XIP), and the like.

The trained classifier 58 can be variously utilized. For example, the trained classifier 58 can be a component of an automated document indexing or organizational system. In another application, the trained classifier 58 can be used with an object classification graphical user interface (GUI). A human operator interfacing with the object classification GUI can select or indicate input objects for classification and can review the classifications assigned to such input objects by the trained classifier 58. In other embodiments, the classifier may be used in an automated or semi-automated form filling application, as described, for example, in U.S. Pub. No. 2008/0267505 entitled DECISION CRITERIA FOR AUTOMATED FORM POPULATION, published on Oct. 30, 2008, by Sebastien Dabet, et al., the disclosure of which is incorporated herein by reference.

Extensions and Alternatives

Some or all of the following may be employed in aspects of the exemplary embodiment.

1. Feature generation from layout attributes. The feature generation process described above is mainly applied to the content features. In the same manner, it is possible to extract frequent patterns relative to the document structure, including layout and segmentation attributes relative to XML nodes, value discretization and attribute binarization.

2. Neighborhood for feature selection and fusion. In the feature selection and fusion steps, features which link the characteristics of the current observations to the label are considered. This approach can be enlarged to neighbor observations. This would help determine a correlation between the current label and characteristics of observations preceding or succeeding the current one. A typical example of where including neighbors' characteristics can help is to link the rule for phone and fax numbers with the presence of terms 'Phone' and 'Fax' in the observation preceding the current one.

3. Feature extraction in the supervised mode. The method for extracting frequent patterns is generative, but it can be transformed into a conditional one, if the element labels are available. The composition of patterns may be expressed in terms of symmetric uncertainty SU, and not the minimal support k, which can be an easier way to prune off the irrelevant features.

4. Feature fusion before the selection. The above described feature generation method applies the feature selection before the feature fusion. The order however may be inverted. Applying the feature fusion before the selection may be useful for merging complementary features before removing the redundant ones.

Without intending to limit the scope of the exemplary embodiment, the following examples demonstrate the application of the methods disclosed herein.

EXAMPLES

Two different corpora which are described above were used with feature generation+selection+fusion evaluations:

BizCard: Collection of about 200 Business Card images, scanned, OCR-ed and annotated with metadata labels.

CPO: Document collection with metadata annotation, created in the framework of VIKEF EU project.

All tests were performed in the cross validation mode. The CPO dataset was split in 20 folds for cross validation, 40 folds were used in for BizCard dataset. For each fold used as the training set, the feature extraction procedure (feature generation, selection and fusion), was applied to the training set. This produced a feature set which was used to train a classifier model from the training set. The model was then used to assign labels to the remaining folds. The average over all folds is reported as the model accuracy for the collection.

Table 2 reports a preliminary evaluation of the automatic feature extraction and compares the results to those for previously generated, manually crafted feature sets (a labor intensive process which involved manually generating features for each of the class labels and refining the set of features until reasonable accuracy could be obtained). For both collections, feature sets were made available from the previous manual evaluations, training classifiers with these sets resulted in an accuracy of 70.97% for BizCard and 87.68% for CPO. The automatic feature generation was run with the minimum support k=2 and used the modified FCBF in the feature selection step. In the feature selection and fusion, a neighborhood of width 1 (the nearest neighbors) and 2 (neighbors of neighbors) was used. As Table 2 shows, the automatic feature extraction tuned with few parameters achieves a classification accuracy comparable to the manually crafted features.

TABLE 2

Evaluation results for binary features

| Collection | Accuracy for Manual feature set | K | Neighborhood | Accuracy |
|---|---|---|---|---|
| BizCard | 70.97 | 2 | 1 | 67.93 |
|  |  | 2 | 2 | 69.37 |
|  |  | 2 | 2, reduced to 200 top | 71.02 |
| CPO | 87.68 | 2 | 1 | 86.47 |

In summary, the exemplary method is effective for the automatic extraction of features from documents with content and structural noise. The method uses techniques of pattern mining and feature selection and merge. The method is based on the automatic analysis of documents and requires no domain knowledge. The exemplary method may employ techniques for frequent pattern extraction from noisy documents and Markov's blanket rules for the feature merge, combined with methods for feature selection.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for extraction of features from document images containing content noise and structural noise comprising:

receiving a dataset of text sequences extracted from noisy document images that include content noise comprising OCR errors and structural noise comprising segmentation errors;

automatically mining the input dataset of text sequences in an unsupervised mode to identify a set of contiguous, frequent patterns, some of the frequent patterns comprising factual patterns consisting of fragments of others of the frequent patterns, wherein each identified factual pattern represents a part or all of a text sequence which is not generalized so as to read on a plurality of different fragments, and in the text sequences, the mining being performed without consideration of class labels applied to the text sequences;

filtering the extracted patterns to generate a set of features, the filtering comprising at least one of:

filtering out redundant patterns, and filtering out irrelevant patterns;

fusing at least some of the features in the set of features to generate a reduced set of features, the fusing of features in the set of features including identifying a pair of complementary features and merging the complementary features, the identifying of complementary features including determining a symmetrical uncertainty for each of the features and their class label and a symmetrical uncertainty for their disjunction and the class label; and outputting at least some of the features in the reduced set of features.

2. The method of claim 1, wherein each of the identified factual patterns has at least a minimum frequency of occurrence.

3. The method of claim 2, wherein the identifying of factual patterns having at least a minimum frequency of occurrence is performed on a sample of the dataset and extended to the entire dataset.

4. The method of claim 1, wherein the identifying of the set of patterns further comprises:

identifying separators in a predefined set of separators, the set of separators including separators which split textual sequences into tokens, the set of separators optionally being extended or reduced to accommodate a syntactic pattern in the input dataset, the factual patterns excluding internal separators identified from the separator set;

identifying generalized patterns based on the factual patterns; and identifying compound patterns, each compound pattern being a concatenation of at least two factual patterns.

5. The method of claim 1, wherein the identification of compound patterns comprises identifying beginning and end locations of the identified factual patterns.

6. The method of claim 1, wherein the filtering comprises filtering out irrelevant patterns by determining a symmetrical uncertainty which is a measure of the independence of a pattern and a class label of a text sequence from which it was extracted.

7. The method of claim 6, wherein the filtering includes filtering out patterns for which the symmetrical uncertainty with the class label is below a threshold value.

8. The method of claim 1, wherein the filtering comprises filtering out redundant patterns by optionally approximated, Markov blanket filtering.

9. The method of claim 1, wherein the documents are structured or semi-structured documents where at least some of the extracted text sequences are labeled with class labels selected from a set of class labels.

10. The method of claim 1, further comprising training a classifier with the output features and their class labels.

11. The method of claim 10, further comprising assigning labels to unlabeled extracted text sequences with the trained classifier.

12. The method of claim 1, further comprising extracting the text sequences from scanned documents with optical character recognition.

13. The method of claim 1, wherein the filtering of the extracted patterns to generate a set of features includes filtering out irrelevant patterns to a set of classes, comprising:
selecting a candidate feature of the feature set;
measuring redundancy of the candidate feature respective to a second feature based on comparison of an estimated uncertainty reduction respective to the set of training objects provided by the candidate feature and provided by the second feature, the estimated uncertainty reductions being further respective at least in part to a sub-set of the classes that is smaller than the set of classes;
filtering out the candidate feature if the redundancy satisfies a filtering criterion; and
repeating the selecting, measuring, and filtering for a plurality of pairs of candidate and second features to generate a filtered set of features.

14. A computer program product comprising a non-transitory storage medium storing instructions, which, when executed by a computer, perform the method of claim 1.

15. A feature generation apparatus comprising memory which stores instructions for performing the method of claim 1, and a processor, in communication with the memory, which executes the instructions.

16. An apparatus for generating a set of features comprising:
a frequent pattern extractor configured for extracting frequent patterns from an input dataset of extracted text sequences;
a feature selection module configured for identifying features from among the frequent patterns by filtering out:
patterns which are not relevant by determining a symmetrical uncertainty which is a measure of the independence of each frequent pattern and a class label of a text sequence from which each frequent pattern was extracted, and
patterns which are redundant, by employing a scalable filtering method to identify correlations between features by determining a symmetrical uncertainty for each of the features and their class label and a symmetrical uncertainty for their disjunction and the class label; and
a feature fusion module configured for identifying features which are able to be merged and which merges two features into a single feature which is a disjunction of the features where the single feature is a Markov blanket of the two features; and
a processor which executes the frequent pattern extractor and feature selection module.

17. The apparatus of claim 16, wherein the scalable filtering method includes Fast Correlation Based Filtering (FCBF).

18. The apparatus according to claim 16, wherein the frequent pattern extractor automatically extracts the frequent patterns in an unsupervised mode without consideration of class labels applied to the text sequences.

19. The method of claim 16, wherein the frequent pattern extractor identifies separators from a predefined set of separators, the frequent patterns excluding internal separators identified from the predefined set of separators.

20. The method of claim 16, wherein the merged feature $F_1 \vee F_2$ is a Markov blanket for the two features $F_2$ and $F_1$ if:
SU(Y, $F_1$)>SU (Y, $F_2$), SU (Y, $F_1 \vee F_2$)>SU(Y, $F_1$), and
SU (Y, $F_1 \vee F_2$)>SU (Y, $F_2$);

where SU denotes symmetrical uncertainty and Y denotes one of the class labels.

21. A method for training a classifier comprising:
automatically mining an input dataset of text sequences in an unsupervised mode to extract a set of frequent patterns in the text sequences, without regard to class labels of the text sequences;
identifying features from among the frequent patterns by filtering out non-relevant and redundant patterns; and
applying at least one criterion for determining whether a plurality of the features are able to be merged and if the at least one criterion is met, merging those features, the criterion merging two features $F_2$ and $F_1$ into a feature $F_1 \vee F_2$ if the feature $F_1 \vee F_2$ is a Markov blanket for the two features;
determining a correlation between the class labels and the features identified by the merged feature $F_1 \vee F_2$; and
inputting the features, optionally after merging of features, into the classifier; and
training the classifier based on the input features and class labels assigned to the corresponding text sequences.

22. The method of claim 21, wherein the applying at least one criterion for determining whether a plurality of features is able to be merged is combined with a scalable filtering method.

23. The method according to claim 21, wherein the merged feature $F_1 \vee F_2$ is a Markov blanket for the two features $F_2$ and $F_1$ if:
SU(Y, $F_1$)>SU (Y, $F_2$), SU (Y, $F_1 \vee F_2$)>SU(Y, $F_1$), and
SU (Y, $F_1 \vee F_2$)>SU (Y, $F_2$);
where SU denotes symmetrical uncertainty and Y denotes one of the class labels.

24. The method of claim 21, wherein the filtering out redundant patterns includes determining a symmetrical uncertainty for each of the features and their class label and a symmetrical uncertainty for their disjunction and the class label.

25. A computer-implemented method for extracting features from document images containing content noise, comprising:
receiving a dataset of text sequences extracted from noisy document images that contain content noise, the content noise including OCR errors;
automatically mining the input dataset of text sequences in an unsupervised mode to extract a set of frequent patterns in the text sequences including separator and factual patterns, without consideration of class labels applied to the text sequences;
filtering the extracted patterns to generate a set of features, the filtering comprising at least one of:
filtering out redundant patterns, and
filtering out irrelevant patterns;
fusing at least some of the features in the set of features to generate a reduced set of features, the fusing of features in the set of features including identifying a pair of complementary features and merging the complementary features, the identifying of complementary features including determining a symmetrical uncertainty for each of the features and their class label and a symmetrical uncertainty for their disjunction and the class label; and
outputting at least some of the features in the reduced set of features.

* * * * *